(12) United States Patent
Itoh et al.

(10) Patent No.: US 6,259,453 B1
(45) Date of Patent: Jul. 10, 2001

(54) MESHING METHOD AND APPARATUS

(75) Inventors: Takayuki Itoh, Kawasaki; Keisuke Inoue, Sagamihara; Atsushi Yamada; Tomotake Furuhata, both of Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/170,338

(22) Filed: Oct. 13, 1998

(30) Foreign Application Priority Data

Oct. 14, 1997 (JP) .................................................. 9-280340

(51) Int. Cl.⁷ .................................................. G06F 15/00
(52) U.S. Cl. .................................................. 345/423
(58) Field of Search .................................. 345/427, 423, 345/419, 474, 473, 118, 121

(56) References Cited

U.S. PATENT DOCUMENTS 5,917,494 * 6/1999 Arai et al. ............................. 345/419

OTHER PUBLICATIONS

Japanese Patent Publication No. Hei 7–230487, Aug. 29, 1995.
Japanese Patent Publication No. Hei 8–315183, Nov. 29, 1996.
Ho–Le K., Finite Element Mesh Generation Method: a Review and Classification, vol. 20, No. 1, 1998, pp. 27–38.
T.D. Blacker, Paving: A New Approach to Automated Quadrilateral Mesh Generation, International Journal for Numerical Methods in Engineering, vol. 32, pp. 811–847, 1991.

* cited by examiner

Primary Examiner—Phu K. Nguyen
(74) Attorney, Agent, or Firm—Louis J. Percello, Esq.; McGinn and Gibb, PLLC

(57) ABSTRACT

A method for automatically generating a mesh (e.g., a quadrilateral mesh, a hexahedral mesh, and the like) includes inputting a geometric model to be meshed, generating a plurality of bubbles within a region of the geometric model, determining a stable allocation of the bubbles by moving the bubbles using a force defined by a potential field provided for the bubbles and controlling a number of the bubbles, and generating the mesh by connecting centers of adjacent bubbles.

26 Claims, 8 Drawing Sheets

MESHING METHOD AND APPARATUS

BACKGROUND OF THE INVENTION

1. Field of the Invention

The present invention relates to a meshing method, and more particularly to a meshing method using bubbles.

2. Description of the Related Art

Meshing or mesh generation is a process for dividing a geometric model-generated computer-aided design (CAD) into a set of small elements. A two-dimensional mesh is provided mainly by a triangular mesh or a quadrilateral mesh. In a computer simulation, such as an analysis of a car crash, a reliable solution cannot be obtained by using a triangular mesh, and a quadrilateral mesh is often employed.

However, while a bubble mesh method for the automatic generation of a triangular mesh is established, as described in, for example, Japanese Unexamined Patent Publication No. Hei 7-230487 and No. Hei 8-315183, there are very few practical methods for automatically generating a quadrilateral mesh. Therefore, in generating a quadrilateral mesh, many analysts rely on a method that is labor-intensive and time-consuming (e.g., several months) to acquire the CAD data for one vehicle.

Further, while there is a large demand for a triangular mesh generation function in the thermal/fluid analysis field, demands also exist for an automatic generation method for a quadrilateral mesh (e.g., a hexahedral mesh in three dimensions) that can be expanded into a three-dimensional shape.

As described above, although there is a large demand for an automatic quadrilateral mesh generation method, not only is automatic generation difficult to achieve, but also the following procedural constituents must be considered.

(1) Little Distortion of Generated Quadrilateral Elements.

According to an analysis performed using computational dynamics, an extremely long element or an element having an extremely large (or small) angle adversely affects the analysis result. Ideally, preferably all the quadrilateral elements have a shape that is as nearly square as possible.

(2) Control of the Direction in which Generated Quadrilateral Elements are Aligned.

According to an analysis performed using the computational dynamics, in many cases it is preferable that elements are aligned in a direction of the physical quantity, such as a stress, or in a direction toward the boundary of a region of a geometric model. Thus, a mesh is desirably generated wherein most of the elements are regularly aligned in a direction designated by a user.

(3) Control of the Distribution of Element Sizes.

To reduce the computation time of applications, preferably fine mesh elements are generated for important portions, and rough mesh elements are generated for less important portions. However, when the size of the mesh elements is suddenly changed, the T-structure (e.g., the state in which the nodal points of adjacent elements lie on a chord) occurs, and adversely affects the analysis. Therefore, the distribution should be provided that is appropriate for the size of the mesh elements, while it can be guaranteed that the connections of the elements will be performed with a nodal point and a chord that is shared.

(4) Applicability to Complicated Curved Model.

There are a variety of shapes that are designed using CAD (e.g., a trim curved shape obtained by cutting one part of a curved region, or a very winding curved shape). It is desirable that a quadrilateral mesh is automatically generated for such a curved shape.

(5) Expansion into a Three-dimensional Mesh.

In accordance with an analysis performed using a current computational dynamics, by providing an improved computation capability, a geometric model is expanded from a two-dimensional model to a three-dimensional model. However, providing a quadrilateral mesh (hexahedral mesh) to be used for a three-dimensional model is still seldom done. Therefore, a method for expanding a two-dimensional mesh into a three-dimensional mesh is desirable that is based on the same operating principle.

According to the above described bubble mesh method, bubbles are generated in a region of a geometric model to be meshed and are moved to stable locations, and the centers of the bubbles are connected to generate a triangle mesh. The main methods employed for generating a quadrilateral mesh from a triangular mesh are as follows:

(1) Method for Linking two Adjacent Triangles to Form a Single Quadrilateral.

Pairing for linking triangles is difficult, and one triangle will remain unlinked if the number of triangles is not even. Further, the thus formed quadrilateral is normally a parallelogram, neither a square nor a rectangle, which are preferable shapes of the mesh element.

(2) Method for Dividing a Triangle into Three Segments.

It is difficult to generate a quadrilateral that is anisotropic.

With either of the above methods problems are encountered in automatic quadrilateral generation with regard to the direction, and currently, merely a heuristic rule is employed in the phase devoted to resolving these problems. Additionally, the method proposed for changing a triangular mesh into a quadrilateral mesh is not very practical, even though the expansion into a three-dimensional mesh is theoretically possible.

Conventional methods for generating a quadrilateral mesh are as follows:

(1) Method for Utilizing Regional Division Performed by a User.

This method is a so-called "mapped mesh" method, whereby a geometric model is divided in advance into regions having three or four sides by manipulating a mouse, and the divided regions are further divided into a lattice shape (e.g., see "Finite Element Mesh Generation Method: a Review and Classification," Ho-Le K., *Computer Aided Designing*, Vol. 20, No. 1, 1988, pp. 27–38). According to this method, since the regional division is performed manually, this runs counter to the requirement for automatic generation. When a mesh is to be generated for all the parts of a vehicle, the job will be enormous. Further, since the result of the regional division, which is a pre-process, varies depending on the user, the mesh generation results obtained differ from user to user.

(2) Method for Sequentially Generating Quadrilateral Elements from the Boundary of Regions.

This method is a so-called "advancing front mesh" method ("Paving: A New Approach to Automated Quadrilateral Mesh Generation," Blacker T. D., *International Journal for Numerical Methods in Engineering*. Vol. 32, pp. 811–847, 1991). According to this method, a row of quadrilateral elements is generated along a region boundary, and another row of quadrilateral elements is generated inside. This process is repeated until the region is filled with quadrilateral elements. However, since the elements inside the region tend to be deformed, requirement (1) is not satisfied. Additionally, since the direction in which the elements are aligned is limited to the direction along the boundary of the regions, requirement (2) is not satisfied.

(3) Method for Embedding Two-dimensional/three-dimensional Lattices Inside a Region.

Two-dimensional lattices or three-dimensional lattices are embedded inside the region, and the surrounding boundaries of the regions are processed by an exception process to generate a mesh. With this method, since the quality of the mesh around the boundaries may be very low and this tends to adversely affect the accuracy of the analysis, requirement (1) is not satisfied. Additionally, since control of the element size is difficult, requirement (3) is not satisfied.

SUMMARY OF THE INVENTION

In view of the foregoing and other problems and drawbacks of the conventional systems and methods, an object of the present invention is to provide a meshing method for automatically generating a quadrilateral mesh.

Another object of the present invention is to provide a meshing method for generating a quadrilateral mesh having less distortion.

Yet another object of the present invention is to provide a meshing method for designating an alignment direction of a quadrilateral mesh that is to be generated.

A further object of the present invention is to provide a hexahedral mesh generation method which enables mesh generation performed in two dimensions to be performed in three dimensions.

It is still another object of the present invention to provide a quadrilateral mesh generation method that can be employed for a complicated geometric model.

It is still an additional object of the present invention to provide a quadrilateral mesh generation method for controlling the sizes of generated mesh elements.

Yet another object of the present invention is to provide a new bubble meshing method that employs a potential as a concept.

According to the conventional bubble meshing method (e.g., Japanese Unexamined Patent Publication No. Hei 7-230487 and No. Hei 8-315183), the intermolecular force between two adjacent bubbles is assumed, and an attractive force and a repulsive force are exerted toward the centers of the bubbles, so that a state where the bubbles are packed like a close-packed hexagonal structure is attained. The alignment of the bubbles in this state is appropriate for the generation of a high quality triangular mesh that is nearest an equilateral triangular shape. On the other side, an example molecular structure where the bubbles are aligned quadratically or hexagonally, instead of being close-packed hexagonally, constitutes a metallic bond. In the metallic bond, when adjacent molecules share an electron, anisotropy is present in the potential surrounding the molecules, and a force exerted in the direction in which the potential is the lowest (e.g., a direction at an angle of 90 degrees to the direction leading to the molecule with which an electron is shared) attracts another molecule.

In the present invention, to implement a bubble alignment that is similar to the molecular alignment in the metallic bond, the potential field that represents an effect of an inter-bubble force is assumed. That is, the inter-bubble force is not always directed toward the centers of the adjacent bubbles, but can be directed toward points that are near the centers, so that inter-bubble force is calculated for a state wherein the bubbles are not in a close-packed hexagonal structure. For the generation of a quadrilateral mesh and a hexahedral mesh, in the present invention, four or six adjacent points at which the potential is the lowest are located in each bubble, and the attractive force for adjacent bubbles acts to bring them to the adjacent points. This makes the processing simple.

In a first aspect, a method according to the present invention includes: inputting a geometric model to be meshed; generating a plurality of bubbles within a region of the geometric model; determining a stable allocation of the bubbles by moving the bubbles using a force defined by a potential field provided for the bubbles and controlling a number of the bubbles and generating the mesh by connecting centers of adjacent bubbles. Since the potential field is provided for individual bubbles, the bubbles can be allocated in correspondence with the potential field, and along with the bubble allocation, nodes of a desirable mesh can be obtained.

If the potential field is the lowest at four points around the bubble, quadrilateral mesh nodes can be acquired, and if the potential field is the lowest at six points around the bubble, hexahedral mesh nodes can be acquired. If the potential field is the lowest at a point near a bubble in a mesh alignment direction, and at a point near a bubble in a direction perpendicular to the alignment direction, a mesh that has a shape closer to that of a square or that of a cube can be obtained.

The force defined by the potential field may be defined as a function of a distance between a point near a bubble at which the potential is the lowest and a bubble that is near that point. By using this distance function, the calculation of the force can be simplified. However, another function may be employed for this calculation.

The potential field may be lowest at two points surrounding a bubble along a line extended in a mesh alignment direction and at four points surrounding the bubble along a line extended in a direction perpendicular to the mesh alignment direction. The stable allocation determining operation may include registering an adjacent bubble at each of the points at which the potential is the lowest. The mesh generating operation may include, by using a bubble that has been registered at the lowest potential point of a first bubble, selecting a bubble to be connected to the first bubble. By using this method, a hexahedral mesh can be acquired.

The selecting operation may include: by using a bubble, which has been registered at the lowest potential point of a first bubble located on the boundary of the geometric model, selecting a second bubble for connecting to the first bubble; and sequentially performing to bubbles inside of the geometric model to be meshed, a process for, by using a bubble, which has been registered at the lowest potential point of a third bubble inside the geometric model, selecting a fourth bubble for connecting to the third bubble. This is the expansion of the advancing front mesh method.

The above-described processing may be performed by a special apparatus or by a computer program. This computer program may be stored on a storage medium, such as a CD-ROM, a floppy disk or an MO (Magneto-optic) disk and the storage medium may be distributed.

The present disclosure relates to subject matter contained in Japanese Patent Application No. 9-280340, filed Oct. 14, 1997, which is expressly incorporated herein by reference in its entirety.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
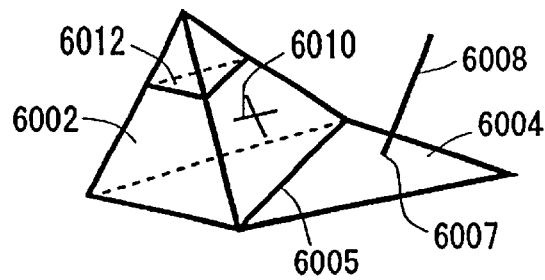
FIG. 1 is a diagram for explaining an exemplary input object.

Preferred embodiments of the present invention will now be described by using an example of meshing for a non-manifold data structure. FIG. 1 shows an example object represented by a non-manifold data structure.

In the object in FIG. 1, a triangle 6004, which is a two-dimensional object, contacts a tetrahedron 6002, which is a three-dimensional object, along an edge line 6005, which is a boundary. A line 6008, which is a one-dimensional object, contacts the triangle 6004 at a point 6007 that is shared. A"",which is a one-dimensional object, is attached to one of the sides of the tetrahedron 6002. Additionally, the tetrahedron 6002 is divided by an internally divided boundary line 6012.

The processing for meshing the object shown in FIG. 1 will now be described referring to the flowchart of FIG. 2.

Figure 3:
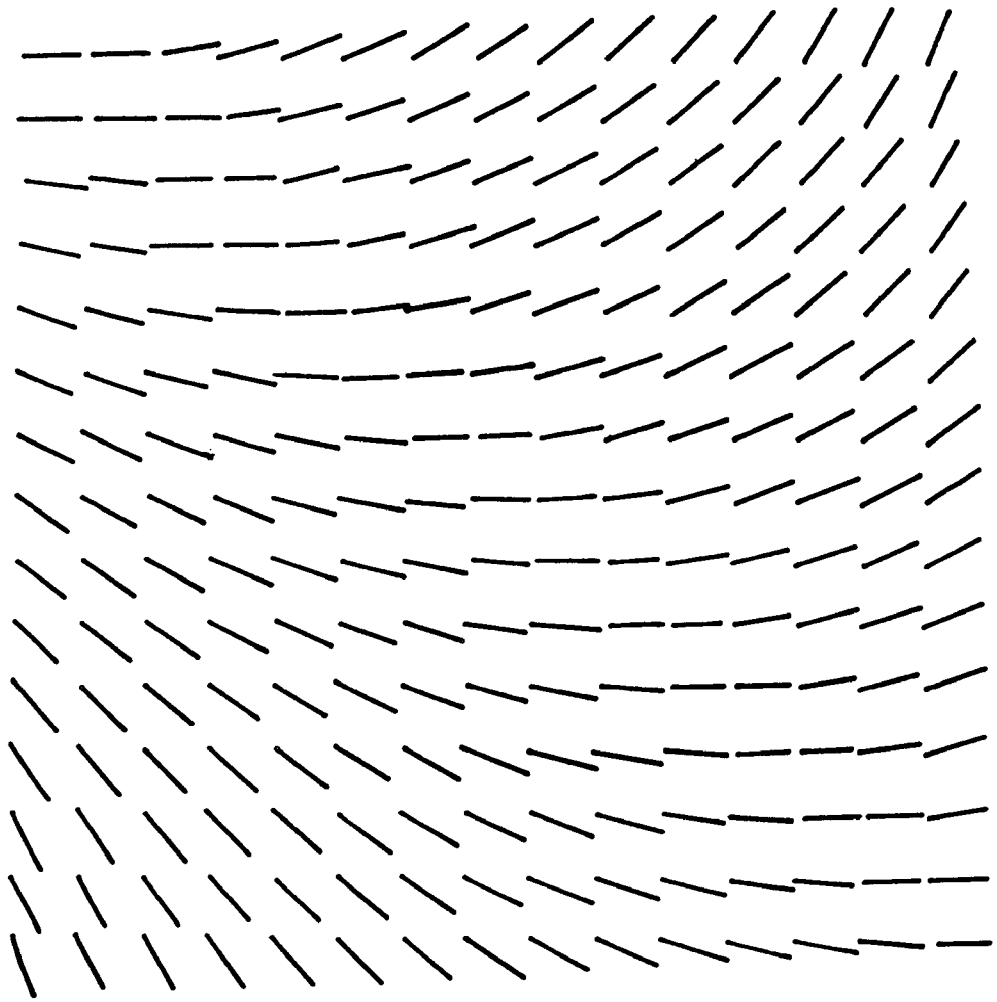
FIG. 3 is a diagram for explaining an exemplary alignment direction.

First, an object to be meshed and a mesh alignment direction are entered (step 110). The object to be meshed is that which is shown in FIG. 1. The mesh alignment direction represents the direction in which individual mesh elements are aligned inside the object, and is provided as a vector. A tensor field is provided for a three-dimensional object. For meshing a plane, for example, the direction of the alignment is as shown in FIG. 3 in which mesh elements are aligned (e.g., direction of the line drawn in FIG. 3) as they are entered. It should be noted that direction details as shown in FIG. 3 need not always be entered, and may not be entered. The mesh alignment direction can be automatically generated.

Figure 4:
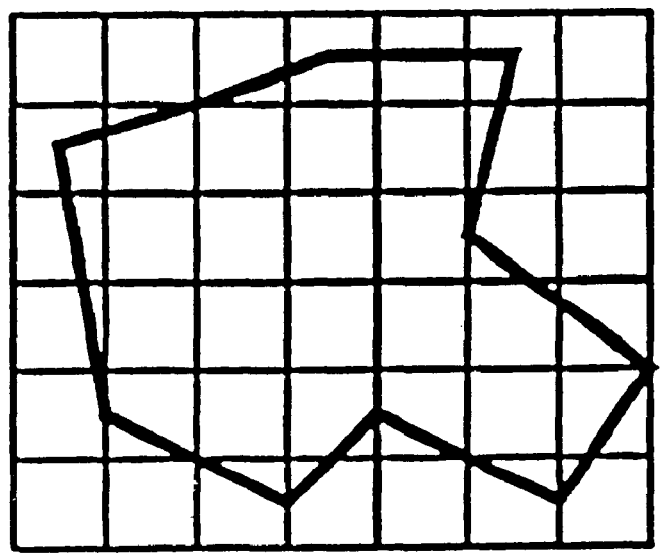
FIG. 4 is a diagram for explaining automatic generation of the alignment direction.
Figure 4:
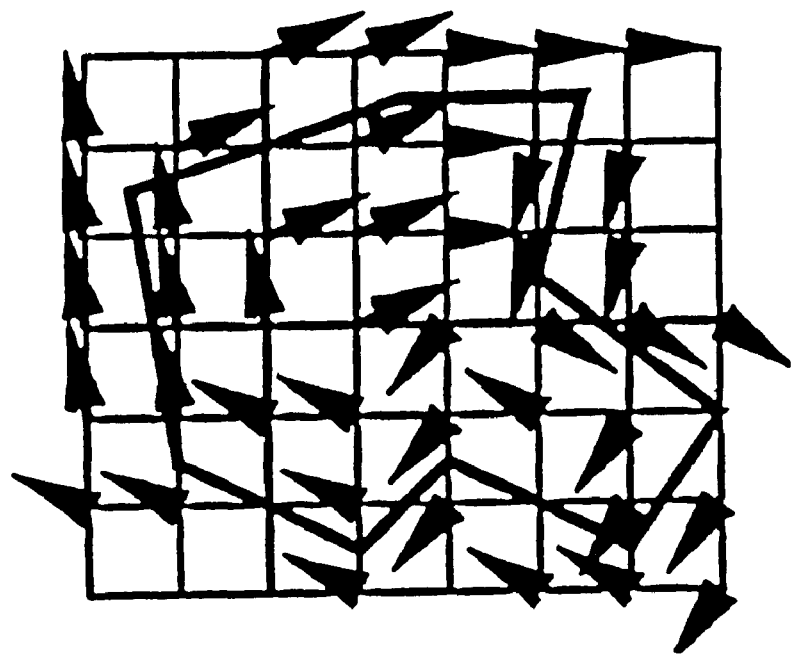

For automatic generation, as shown in FIG. 4(a) an orthogonal lattice shape superimposed on the region is assumed. A boundary line that is closest to each point that forms the orthogonal lattice is selected, and its vector is provided for the lattice points.

Then, the vectors are located at the individual lattice points, as shown in FIG. 4(b). The alignment direction of the individual bubbles is determined by linearly interpolating the vectors provided for the four lattice points that enclose a bubble. For a three-dimensional object, an orthogonal lattice shape superimposed on the object region is assumed. A closest boundary node is selected for each lattice point that constitutes the orthogonal lattice, and the mesh alignment direction near the node on the boundary surface is provided for the lattice point. As a result, an expansion to three dimensions is possible.

Then, the mesh nodes at the vertices and the edge lines of the input object are allocated (step 120). The process employed for the vertices and the edge lines is the same as used for the conventional bubble mesh method, and another method can be employed because when handling the vertices and the edge lines, the present invention has no noticeable effect. According to the method described in, for example, Japanese Unexamined Patent publication No. Hei 7-230487, (1) bubbles are allocated at the vertices, (2) bubbles are allocated along the edge lines, (3) the bubbles are moved by the inter-bubble force defined according to a specific rule and the number of the bubbles is controlled by examining the density of the bubbles, then the stable allocation of the bubbles is determined, and (4) the centers of the bubbles are defined as mesh nodes. The process employed for the vertices and the edge lines is thereafter completed.

The bubbles are initially located at the surfaces of the input object (step 130). In this embodiment, no special process is required for the initial bubble arrangement. The sizes of the bubbles will be designated separately, and bubbles having a size designated by the vector can be generated and located within the surfaces.

As described above, there are flat surfaces and curved surfaces. No particular problems are encountered with a flat surface, but for a curved surface, a method is employed whereby the bubbles are arranged in a parametric space corresponding to the curved surface, and this arrangement is mapped onto the curved surface to perform the initial allocation.

Thereafter, the stable bubble allocation is determined (step 140). This process will be described below.

TABLE 1

```
10:    for (repeat until the maximum bubble movement distance is
           equal to or smaller than a threshold value) {
15:    triangular division
20:    /*portion for calculation of the force and a bubble movement*/
30:    for (each bubble) {
40:        ● setup of potential fields for adjacent bubbles
50:        ● calculate the sum of forces exerted using the
               potential fields of the adjacent bubbles
60:        ● move the bubble according to the exerted forces
70:    }
80:    /*portion for adding or deleting bubble*/
90:    for (sides of each triangle) {
100:       if (a side is much longer than the sum of the
               radii of the bubbles) {
110:           ● add a new bubble at the midpoint of the side
120:       }
130:       if (a side is much shorter than the sum of the
               radii of the bubbles) {
140:           ● delete a bubble a either end of the side
```

TABLE 1-continued

```
150:      }
160:    }
170:  }
```

A description of the above pseudo code will now be given. The lines 10 to 170 are repeated until the value of the maximum bubble movement distance is equal to or less than the threshold value. The comparison with the threshold value may be performed to the average value of the movement distances of all the bubbles. The process provided by lines 10 to 170 is repeated until there is little movement of the bubbles. The number of the repetitions can be controlled according to the threshold value. However, when a large threshold value is set, before the bubble allocation is stabilized the distance value will be equal to or less than the threshold value and the processing will be terminated.

The portion from line 10 to line 170 is divided into three segments. The first segment, for triangular division, is line 15, the second segment, for calculation of the inter-bubble force and the bubble movement, extends from line 20 to line 70, and the third segment, for control of the number of bubbles, extends from line 80 to line 160.

In the first segment at line 15, the triangle division is performed to understand the positional relationships of the bubbles. Delaunay triangular division, for example, can be used as the triangular division method. Since the triangular division is performed to understand how the adjacent bubbles are positioned relative to each other, it may not be performed so long as such a relationship can be ascertained without the triangular division.

The second segment, line 20 to line 70, is further divided into three additional segments. At line 40, first bubbles adjacent to a second bubble that is an object of the calculation is specified, and potential fields are set for the adjacent bubbles. The potential field for a quadrilateral mesh can be, for example, as shown in FIG. 5.

Figure 5:
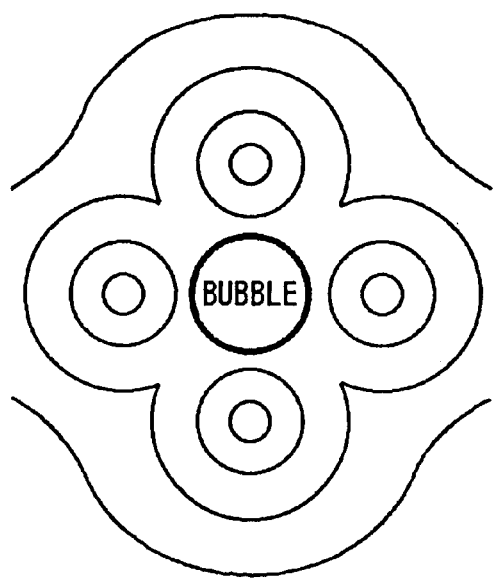
FIG. 5 is a diagram showing an exemplary potential field set for a bubble.
Figure 6:
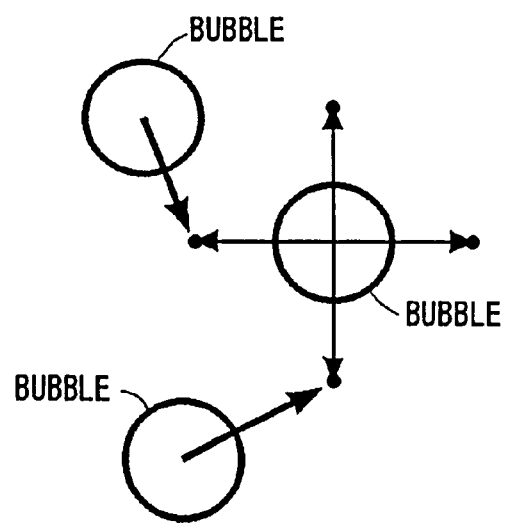
FIG. 6 is a diagram showing an exemplary potential field set for a bubble.

When the field that expands as shown in FIG. 5 is defined, a large number of calculations are required to obtain the values of the accompanying force. Therefore, in this embodiment, as shown in FIG. 6, four points having the lowest potential are defined around a single bubble and along two orthogonal line segments that pass through the center of the bubble. In this embodiment, since at step 110 in FIG. 2, a vector is input to specify the alignment direction, the vector and another vector perpendicular to the vector represent the directions of two orthogonal line segments.

Figure 7:
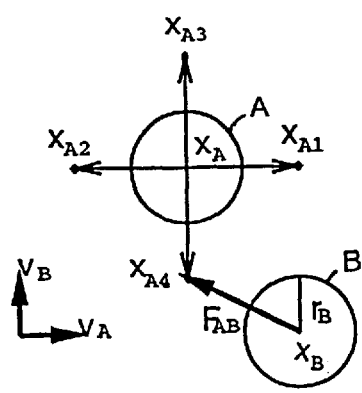
FIG. 7 is a diagram for explaining the lowest potential point set for a bubble.

Following this, at line 50 the sum of the forces exerted by the potential fields of the adjacent bubbles is calculated. In this embodiment, the bubbles are virtual circles (e.g., for a two dimensional object, and spheres for a three-dimensional object) that have a mass m. All the bubbles may have the same mass, or may have different masses depending on their sizes. The force exerted between these objects will now be described referring to FIG. 7. Assume that the center point of adjacent bubble A is $X_A$, its radius is $r_A$, an input vector is $v_A$, and a vector obtained by employing the outer product of the normal direction N and the vector $v_A$ is $v_B$ ($v_A$ and $v_B$ are unit vectors). At this time, locations $x_{A1}$, $x_{A2}$, $x_{A3}$, and $x_{A4}$ for the lowest potential points are acquired as follows:

$x_{A1} = x_A - 2r_A v_A$ $x_{A2} = x_A + 2r_A v_B$ $x_{A4} = x_A - 2r_A v_B$

Assume that bubble B, which is an object of the calculation, receives the force from lowest potential point $A_c$ of adjacent bubble A, which is positioned at the shortest distance. The force $F_{AB}$ exerted between the bubbles A and B is represented as follows by employing distance $d_{AB}$ between the centers of the bubbles A and B.

$$F_{AB} = \left| f\left(\frac{d_{AB}}{r_A + r_B}\right) \right| \frac{x_{AC} - x_B}{|x_{AC} - x_B|} \quad (1)$$

Figure 8:
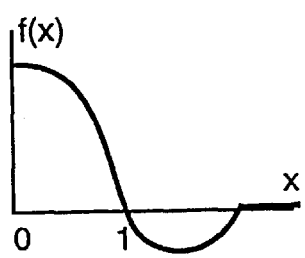
FIG. 8 is a diagram for explaining function f(x) defined for the inter-bubble force in one embodiment.
Figure 9:
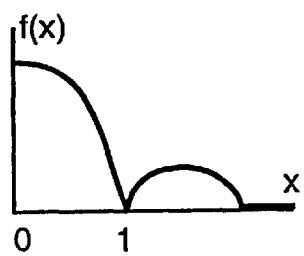
FIG. 9 is a diagram showing |f(x)|.

$r_B$ denotes the radius of the bubble B, and f(x) is represented as the function shown if FIG. 8. Since the absolute value of f(x) is employed in this embodiment, the function is actually the one shown in FIG. 9.

Figure 10:
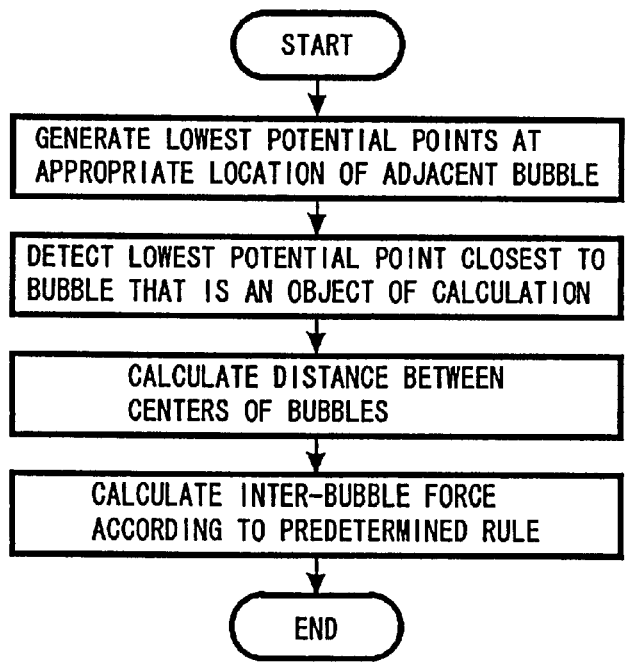
FIG. 10 is a flowchart for the inter-bubble force calculation processing.
Figure 12:
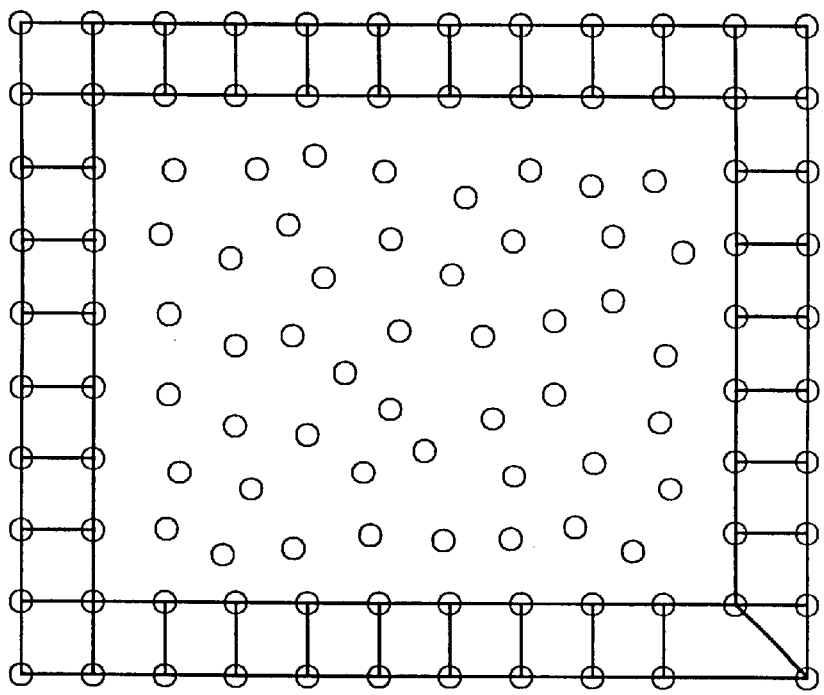
FIG. 12 is a diagram for explaining the employment of the modified advancing front method in a two-dimensional area.

The calculation of the force $F_{AB}$ is performed for all the bubbles adjacent to the bubble B, and the obtained forces are added together. The processing for the calculation of the inter-bubble force is shown in FIG. 10.

It is preferable that information for linking the center points of the bubbles is stored. That is, the bubble nearest a lowest potential point is stored so as to correspond to the lowest potential point. For example, since the point $x_{A4}$ is determined to be the point $A_c$ positioned at the shortest distance from the bubble B in FIG. 7, the bubble B is registered at point $X_{A4}$. This registration process represents a side of a mesh element, and implies the dynamic connection of the sides of mesh elements while the bubbles are moved. As for bubbles along the boundary, a lowest potential point is located in the direction perpendicular to the boundary.

At line 60, bubbles are actually moved. For this process, the distance that the bubbles are moved need only be calculated. When the individual points are regarded as points of mass m (e.g., not including an inertia moment), and when the second-order ordinary differential equation is solved while taking the inter-bubble force and viscosity into consideration, the locations of the bubbles are changed. The Newton equation is represented as follows.

$$m_i \frac{d^2 x_i(t)}{dt^2} + C_i \frac{dx_{i(t)}}{dt} = f_{xi}(t) \quad (2)$$

$$m_i \frac{d^2 y_i(t)}{dt^2} + C_i \frac{dy_i(t)}{dt} = f_{yi}(t)$$

$$m_i \frac{d^2 z_i(t)}{dt^2} + C_i \frac{dz_i(t)}{dt} = f_{zi}(t)$$

$x_i$ denotes the x coordinate of an i-th bubble, $m_i$ denotes the mass of the i-th bubble, $y_i$ denotes the y coordinate of the i-th bubble, and $z_i$ denotes the z coordinate of the i-th bubble. The term of the first-order differential includes a viscosity coefficient q while taking the viscosity into consideration. A different viscosity coefficient can be set for each bubble and for each x, y, or z direction, or a constant value c can be set. Functions $f_{xi}(t)$, $f_{yi}(t)$ and $f_{zi}(t)$ on the right side of equation 2 are, respectively, the sum of x elements, the sum of y elements, and the sum of z elements of the force that is exerted by the adjacent bubbles relative to the i-th bubble at time t.

In equation 2, time t is incremented by $\Delta t$ by performing a numerical analysis method using a well known ordinary differential equation, such as the Runge-Kutta method, to calculate the coordinates of the individual bubbles.

As previously described, since the number of repetitions of the pseudo code lines 10 to 170 is decided by determining whether the value of the movement distance is equal to or less than the threshold value, movement distance ($\Delta x$, $\Delta y$, $\Delta z$) is also calculated. Since the original coordinates are acquired in advance, only movement distance ($\Delta x$, $\Delta y$, $\Delta z$) need be calculated. The numerical analysis method using the ordinary differential equation is not limited to the Runge-Kutta method, but also the Adams or Euler method may also be employed (e.g., see "Numerical Calculation," Osamu Jonouchi, *Mathematics* 15 *for Engineering*, Science Co., Ltd., September, 1978).

The process extending from pseudo code line 40 to line 60 is performed for all the bubbles. As a result, the coordinates (and/or the movement distance ($\Delta x$, $\Delta y$, $\Delta z$)) of the bubbles after minute time $\Delta t$ has elapsed can be obtained.

There are some bubbles that do not remain within the surface after they are moved. For a curved surface, a process for returning these bubbles to the surface is performed. To do this, a method for returning the bubbles to the interior of the surface in the normal direction of the surface is performed, or another method may be employed. For a flat surface, the bubbles that are outside are destroyed.

The process from line 80 to line 160, which is the third segment, for adding or deleting a bubble will now be described.

At line 90, the following process is repeated for each side of each triangle. This triangle is the one for a mesh obtained by the triangular division performed at pseudo-code line 15. Since the bubbles are moved after the process at pseudo code line 15 is completed, the triangular division may again be performed before the next process is begun at line 80. However, the performance of this division process is arbitrary.

At line 110, it is checked whether the ratio of the length of a side of a triangle to the sum of the radii of two bubbles, which intersect with the side of the triangle, is equal to or smaller than a first threshold value. That is, a determination is made as to whether a gap between the bubbles is too large. When the ratio is equal to or smaller than the first threshold value, one bubble is generated at the midpoint of the side of the triangle (pseudo-code line 120).

When the ratio is equal to or greater than a second threshold value (pseudo-code line 130), a bubble at either end of the side of the triangle is removed (pseudo-code line 140) because this means the bubbles are too closely packed. No process is performed for the sides that do not match either condition. As a result, the number of bubbles are controlled appropriately.

The control of the number of bubbles which is mainly based on the side of the triangle has been explained. However, the present invention is not limited to this method, and a method that employs a degree of overlap, which is described in the above-mentioned Japanese Unexamined Patent Publication No. Hei 8-315183 may be employed. For the following processing, it is preferable that the triangular division is again performed here.

When the process is returned to line 10, it is checked whether the maximum bubble movement distance, acquired at line 60, exceeds the threshold value. As the movement distance, $(\Delta x^2+\Delta y^2+\Delta z^2)^{0.5}$, may be employed, or simply $|\Delta x|+|\Delta y|+|\Delta z|$.

When the maximum movement distance exceeds the threshold value, the process between lines 10 to 170 is repeated. When the maximum movement distance does not exceed the threshold value, it is assumed that the bubbles are stably allocated and the following process is initiated.

Figure 2:
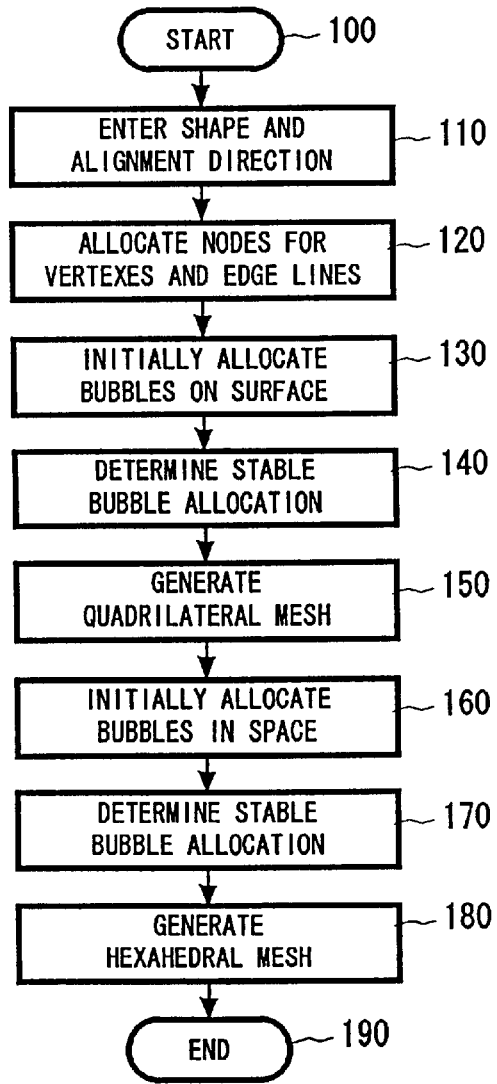
FIG. 2 is a flowchart for the processing according to the present invention.

The above processing is performed at step 140 in FIG. 2. Then, the centers of the bubbles are connected to generate a quadrilateral mesh (step 150 in FIG. 2). This is done by using a conventional advancing front (e.g., the conventional technique described above) or a method for converting a triangular mesh.

According to the advancing front method, a line segment that connects two adjacent nodes located along the boundary of the region and a node located respectively apart from the adjacent nodes, at a distance close to a designated distance, are selected, and the two adjacent nodes and the selected nodes are connected together to generate a triangular element or a quadrilateral element. Since the processing to select a node separated by a specific distance is complicated, in this embodiment, the bubbles registered at the lowest potential points of each bubble is employed to select a node to be connected.

Figure 11:
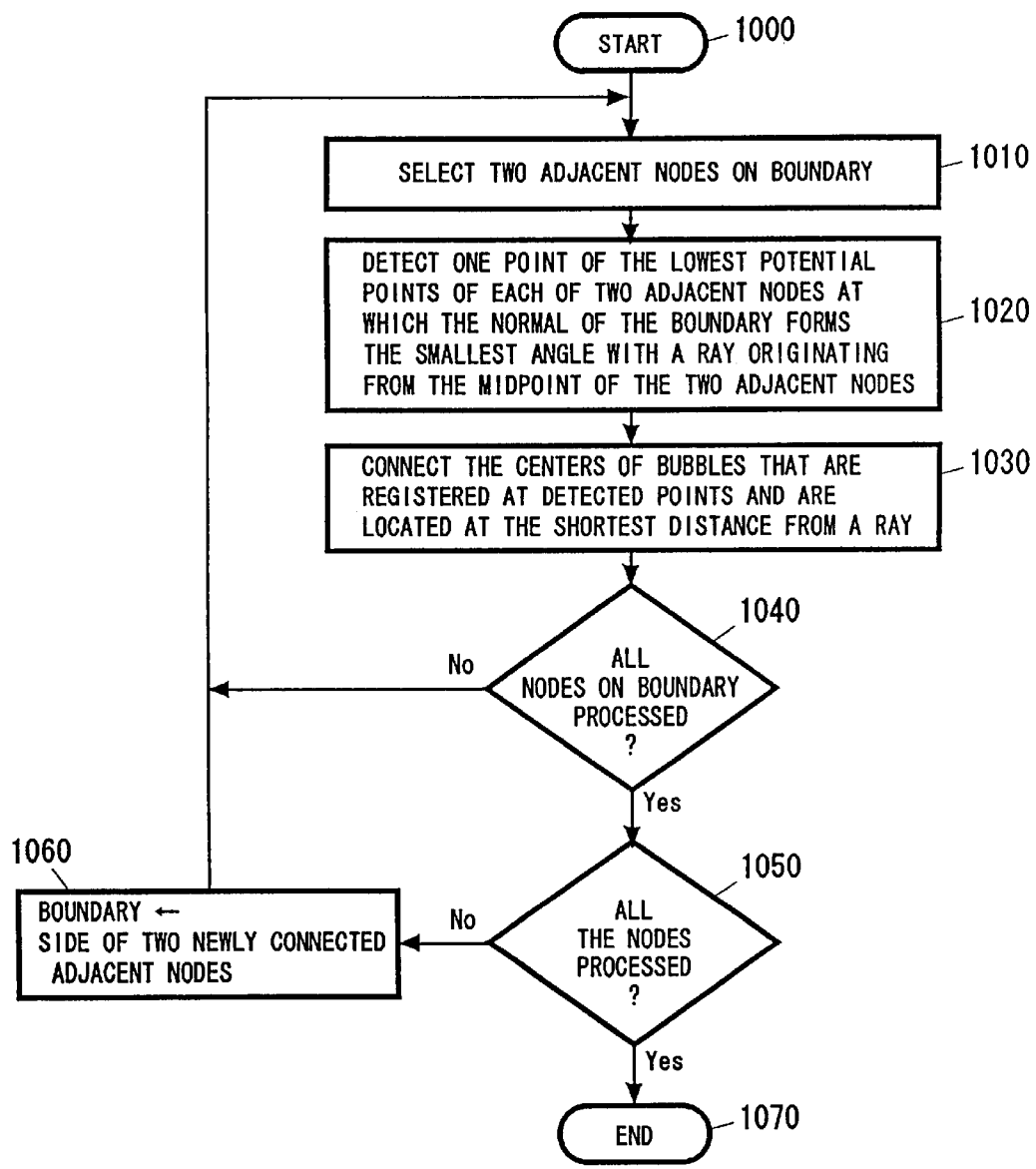
FIG. 11 is a flowchart for the processing for employing the modified advancing front method in a two-dimensional area.

The processing will be explained referring to FIG. 11.

First, two adjacent nodes along the boundary are selected (step 1010). One of the lowest potential points of the selected adjacent node, at which the normal direction of the boundary forms the smallest angle with a ray originating at the midpoint between the two adjacent nodes, is detected for each of the two adjacent nodes (step 1020).

The center of a bubble which is registered in each of the detected points and is closest to the ray is connected as a node that together with the two adjacent nodes constitutes one mesh element (step 1030). This process is performed for all the nodes on the boundary (step 1040). As a result, a row of mesh elements can be generated inside and along the boundary of the region.

The boundary is replaced with the side between the newly connected adjacent nodes (step 1060) until the process is completed for all the nodes (step 1050), and program control returns to step 1010. When the process is completed for all the nodes, the processing is thereafter completed (step 1070).

In the triangular division process, a conventional triangular mesh generation method, such as the Delaunay triangular mesh generation method, is employed to connect the centers of the bubbles and to generate a triangular mesh. As many as possible triangular elements that form the triangular mesh are paired to change them into quadrilateral elements. When the bubbles that are generated in the two-dimensional region by the present invention are employed, the method for conversion from the triangular mesh can be used to generate a quadrilateral mesh. The triangular mesh, which is generated by using the bubbles generated by this invention, is not a high quality mesh composed of nearly equilateral triangles, but is composed of triangles obtained by dividing nearly square quadrilaterals into two along diagonal lines (e.g., right isosceles triangles). Thus, when the triangles are paired to form quadrilaterals, most of the elements are automatically shaped like nearly square quadrilateral elements, and the conventional problem is eliminated.

By using either method, a mesh in which most of the elements are quadrilateral elements can be produced from the bubbles generated using this invention. In the present invention, however, there is no guarantee that all the elements will be quadrilateral, and a mixture containing triangular elements may be obtained. However, this does not affect the actual analysis very much because a mesh that contains a few triangular elements is generally employed as a quadrilateral mesh. To guarantee that all the quadrilaterals, as in the method employed in Japanese Patent No. 2642070, a generated triangular mesh is changed into a quadrilateral mesh, which in turn is changed into a quadrilateral mesh having elements half of the size of the first quadrilateral mesh.

The meshing for the surface is thereafter completed.

Next, a hexahedral mesh is generated in a three-dimensional space. First, bubbles are initially allocated for the space (step 160 in FIG. 2). Since stable bubble locations have been calculated for the vertices, the edge lines and the surfaces, they are employed for the vertices, the edge lines and the surfaces, and bubbles are located only inside the tetrahedron 6002 in FIG. 1. Then, the stable bubble allocation is calculated (step 170).

Although this calculation is substantially the same as that for the surface, it differs as follows.

Figure 13:
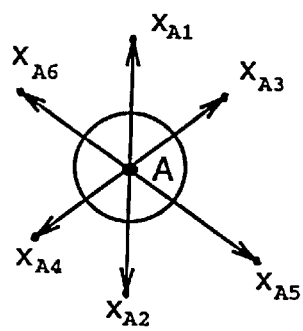
FIG. 13 is a diagram for explaining the location of a lowest potential point set for a spherical bubble.

(1) Instead of four, six lowest potential points exist, as shown in FIG. 13. The locations $x_{A1}$, $x_{A2}$, $x_{A3}$, $x_{A4}$, $x_{A5}$, and $x_{A6}$ of the points are as follows:

$$X_{A1} = x_a + 2r_A V_A$$
$$X_{A2} = X_A - 2r^A V_A$$
$$X_{A3} = X_A + 2r^A V_B$$
$$X_{A4} = X_A - 2r^A V_B$$
$$X_{A5} = X_A + 2r^A V_C$$
$$X_{A6}32\ X_A - 2r_A V_C$$

where $v_c$ is another unit vector perpendicular to $v_a$ (2) Instead of two adjacent nodes, four nodes that constitute a generated quadrilateral element are processed using the modified advancing front method to form mesh elements. The origin of the ray is the center of gravity of the quadrilateral element.

Figure 14:
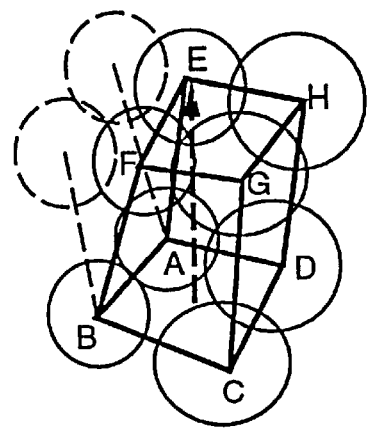
FIG. 14 is a diagram for explaining the employment of the modified advancing front method in a three-dimensional space.

FIG. 14 shows an example quadrilateral mesh element ABCD at the boundary surface. The arrow indicated by the broken line is a ray projected from the center of gravity of the element ABCD. A registered bubble element EFGH is so selected that forms an angle with this ray linked to A and B by broken lines are bubbles that were not selected because their angles relative to the ray are greater than are those of bubbles E and F.

In FIG. 14, EFGH corresponds to ABCD. If there is an overlap in EFGH, an element enclosed by two quadrilaterals and two triangles, and an element enclosed by a trigonal prism, a quadrangular pyramid, two quadrilaterals and two triangles are generated. When an element enclosed by two quadrilaterals and two triangles is generated, this can be divided into tetrahedrons, and even for an element having another shape, hexahedrals can be produced as needed. In many cases, even when a mixture is obtained that contains elements having such shapes, they have little adversely effect.

(4) While the process was previously described for returning inside the plane the bubbles located outside the plane, here, the bubbles that are outside the three-dimensional space are merely deleted. While taking this change into consideration, the process employed for the plane can be easily expanded to obtain the process for use with the three-dimensional space.

The embodiment for the generation of a quadrilateral mesh and a hexahedral mesh has been explained. However, the present invention is not limited to the above embodiment. Further, while one example expansion of the advancing front has been explained, modifications of the advancing front can be employed. Additionally, the conventional advancing front may be employed. The Delaunay triangular mesh generation method has been explained as the node connection method, but another connection method may be employed.

Further, in this embodiment the shape of bubble is circular or spherical. However, an elliptical bubble may be employed to prepare a rectangular mesh instead of a square mesh. When the geometric model to be meshed has a curved surface, it is possible to move circular or ellipse bubbles in the parameter space and then to perform mapping on the original curved surface.

Figure 15:
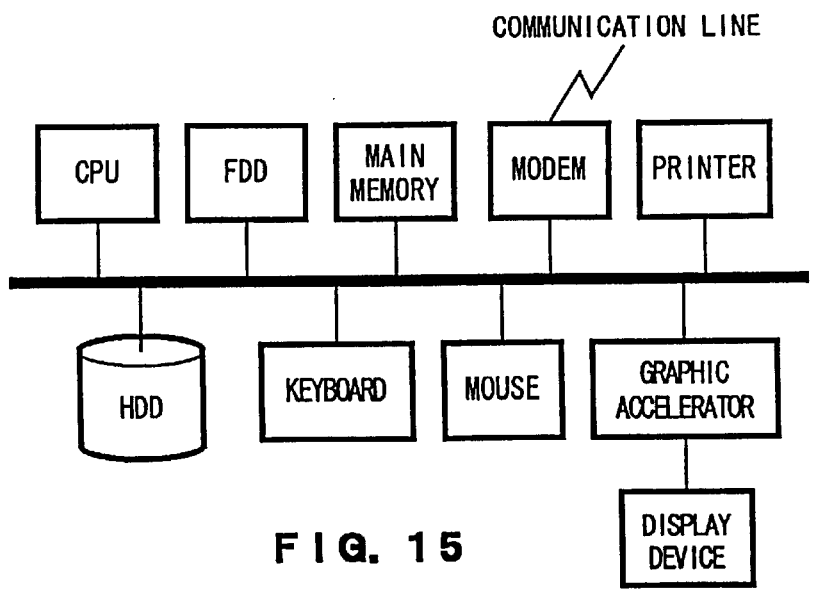
FIG. 15 is a diagram for explaining an ordinary computer system.

The above-described processing can be implemented as an ordinary computer program, which can be executed by a computer system shown in FIG. 15, for example. The computer program and required data that are stored on a hard disk drive, are loaded to a main memory, as needed, and are then executed by a CPU. Data can also be supplied via a keyboard, from a floppy disk drive or another storage medium, or across a communication line connected by a modem or another communication device. The computer program may also be supplied by another computer system, or on a floppy disk, a CD-ROM or another storage medium. The results obtained by the processing performed in this invention are employed for numerical analysis by another computer program stored on the HDD, and can be provided for a user by a display device or by a printer.

The present invention can be implemented by a dedicated device. For example, modules may be prepared for executing the above individual processing steps and may exchange data to output the final results. In the above embodiment, since the triangular division is performed a number of times, a dedicated triangular division module maybe prepared and be shared.

According to the present invention, a meshing method for automatically generating a quadrilateral mesh can be provided. Further, a meshing method can be provided for generating a quadrilateral mesh having less distortion. Moreover, a meshing method can be provided for designating a direction in which a generated quadrilateral mesh is aligned.

A hexahedral mesh generation method can be provided by which a method performed in two dimensions can be performed in three dimensions. Additionally, a quadrilateral mesh generation method can be provided can be employed for a complicated geometric model. A quadrilateral mesh generation method also can be provided for controlling the sizes of generated mesh elements. Further, a new bubble meshing method can be provided that employs a potential as a concept.

While the invention has been described in terms of a single preferred embodiment, those skilled in the art will recognize that the invention can be practiced with modification within the spirit and scope of the appended claims.

What is claimed is:

1. A method for generating one of a quadrilateral mesh and a hexahedral mesh, comprising:
   inputting a geometric model to be meshed;
   generating a plurality of bubbles within a region of the geometric model;
   determining a stable allocation of said bubbles by registering bubbles at adjacent points at which a potential field is lowest for each bubble and moving said bubbles using a force defined by said potential field and controlling a number of said bubbles; and
   generating the one of a quadrilateral mesh and a hexahedral mesh by connecting centers of adjacent bubbles.

2. The method according to claim 1, wherein said potential field is lowest at four points around a bubble.

3. The method according to claim 1, wherein said potential field is lowest at six points around a bubble.

4. The method according to claim 1, wherein said potential field is lowest at a point near a bubble in a mesh alignment direction, and a point near a bubble in a direction perpendicular to the mesh alignment direction.

5. The method according to claim 1, wherein said force is defined as a function of a distance between a point near a bubble at which the potential is lowest and a bubble that is near said point.

6. The method according to claim 1, wherein said potential field is lowest at two points surrounding a bubble along a line extended in a mesh alignment direction and at four points surrounding the bubble along a line extended in direction perpendicular to the mesh alignment direction, and wherein said mesh generating includes, by using a bubble that has been registered at the lowest potential point of a first bubble, selecting a bubble to be connected to said first bubble.

7. The method according to claim 6, wherein the selecting is performed by employing, as the first bubble, a bubble located on the boundary of the geometric model and then by employing, as the first bubble, a bubble inside the geometric model.

8. The method of claim 1, wherein said model includes attractive and repulsive forces, such that each bubble in the model has five extreme potential points.

9. The method of claim 1, wherein said model archives an orthogonal packing of bubbles, such that said one of said quadrilateral mesh and said hexahedral mesh is generated by connecting centers of said orthogonally packed bubbles.

10. An apparatus for generating a one of a quadrilateral mesh and a hexahedral mesh, comprising;

an input module for inputting a geometric model to be meshed;

a bubble generation module for generating a plurality of bubbles within a region of the geometric model; and a stable allocation determination module for determining a stable allocation of said bubbles by registering bubbles at adjacent points at which a potential field is lowest for each bubble and moving said bubbles using a force defined by said potential field and controlling a number of said bubbles and a mesh generation module for generating said one of a quadrilateral mesh and a hexahedral quadrilateral mesh by connecting centers of adjacent bubbles.

11. The apparatus according to claim 10, wherein said potential field is lowest at four points around the bubble.

12. The apparatus according to claim 10, wherein said potential field is lowest at six points around the bubble.

13. The apparatus according to claim 10, wherein said potential field is lowest at a point near a bubble in a mesh alignment direction, and at a point near a bubble in a direction perpendicular to the mesh alignment direction.

14. The apparatus according to claim 10, wherein said force is defined as a function of a distance between a point near a bubble at which the potential is lowest and a bubble that is near said point.

15. The apparatus according to claim 14, wherein said potential field is lowest at two points surrounding a bubble along a line extended in a mesh alignment direction and at four points surrounding the bubble along a line extended in a direction perpendicular to the mesh alignment direction, and wherein said mesh generation module selects a bubble to be connected to a first bubble by using a bubble that has been registered at the lowest potential point of said first bubble.

16. The apparatus according to claim 15, wherein the bubble selection process by the mesh generation module is performed by employing, as the first bubble, a bubble located on the boundary of the geometric model and then employing, as the first bubble, a bubble inside the geometric model.

17. The apparatus of claim 10, wherein said model includes attractive and repulsive forces, such that each bubble in the model has five extreme potential points.

18. The apparatus of claim 10, wherein said model archives an orthogonal packing of bubbles, such that said one of said quadrilateral mesh and said hexahedral mesh is generated by connecting centers of said orthogonally packed bubbles.

19. A storage medium for storing a meshing program for creating one of a quadrilateral mesh and a hexahedral mesh, said meshing program enabling a computer to perform:

inputting a geometric model to be meshed;

generating a plurality of bubbles within a region of the geometric model;

determining a stable allocation of the bubbles by registering bubbles at adjacent points at which a potential field is lowest for each bubble and moving the bubbles using a force defined by said potential field and controlling a number of said bubbles; and generating said one of said quadrilateral mesh and said hexahedral quadrilateral mesh by connecting centers of adjacent bubbles.

20. The storage medium according to claim 19, wherein said potential field is lowest at four points around a bubble.

21. The storage medium according to claim 19, wherein said potential field is lowest at six points around a bubble.

22. The storage medium according to claim 19, wherein said potential field is lowest at a point near a bubble in a mesh alignment direction, and a point near a bubble in a direction perpendicular to the mesh alignment direction.

23. The storage medium according to claim 19, wherein said force is defined as a function of a distance between a point near a bubble at which the potential is lowest and a bubble that is near said point.

24. The storage medium according to claim 19, wherein said potential field is lowest at two points surrounding a bubble along a line extended in a mesh alignment direction and at four points surrounding the bubble along a line extended in a direction perpendicular to the mesh alignment direction, and wherein said one of said quadrilateral mesh and said hexahedral quadrilateral mesh generating includes, by using a bubble that has been registered at the lowest potential point of a first bubble, selecting a bubble to be connected to said first bubble, and wherein the selecting is performed by employing, as the first bubble, a bubble located on the boundary of the geometric model and then by employing, as the first bubble, a bubble inside the geometric model.

25. The storage medium of claim 19, wherein said model includes attractive and repulsive forces, such that each bubble in the model has five extreme potential points.

26. The storage medium of claim 19, wherein said model archives an orthogonal packing of bubbles, such that said one of said quadrilateral mesh and said hexahedral mesh is generated by connecting centers of said orthogonally packed bubbles.

* * * * *